United States Patent [19]

Ogaki et al.

[11] Patent Number: 5,485,368

[45] Date of Patent: Jan. 16, 1996

[54] SYSTEM FOR SPECIFYING A DUTY BY MEANS OF A HANDWRITTEN SHEET WITH A CIPHER FUNCTION

[75] Inventors: Takeshi Ogaki, Tokyo; Yoshiko Takeda, Yokohama, both of Japan

[73] Assignee: Kabushiki Kaisha Toshiba, Kawasaki, Japan

[21] Appl. No.: 215,356

[22] Filed: Mar. 21, 1994

[30] Foreign Application Priority Data

Mar. 25, 1993 [JP] Japan .................................. 5-067067

[51] Int. Cl.⁶ .................................................. G05B 19/42
[52] U.S. Cl. ........................... 364/191; 379/100; 358/402
[58] Field of Search .................................. 364/188–191; 379/100; 358/468, 436, 400, 402, 440, 403, 407; 380/25, 4; 382/61; 283/117

[56] References Cited

U.S. PATENT DOCUMENTS

| | | | |
|---|---|---|---|
| 5,115,326 | 5/1992 | Burgess et al. | 358/440 |
| 5,247,591 | 9/1993 | Baran | 382/61 |
| 5,267,303 | 11/1993 | Johnson et al. | 379/100 |

FOREIGN PATENT DOCUMENTS

| | | |
|---|---|---|
| 63-314687 | 12/1988 | Japan . |
| 1264359 | 10/1989 | Japan . |
| 3144835 | 6/1991 | Japan . |
| 4018844 | 1/1992 | Japan . |
| 4277824 | 10/1992 | Japan . |

Primary Examiner—James P. Trammell
Attorney, Agent, or Firm—Cushman Darby & Cushman

[57] ABSTRACT

An information processing apparatus for executing a plurality of information processing, the apparatus comprises device for storing format information about the contents of instructions to execute at least one of the plurality of information processes, function for printing the format information stored in the storing device and first code information for judging permission to execute the information processing on a sheet, function for reading the sheet printed by the printing function for inputting the contents of instructions required to be executed on the information processing apparatus, input function for inputting second code information when the reading function reads the sheet, function for collating the first code information printed on the sheet by the printing function with the second code information input by the input function, and function for permitting the execution of a process corresponding to the contents of instructions printed on the sheet read by the sheet reading function on the basis of the collation result at the collating function.

5 Claims, 7 Drawing Sheets

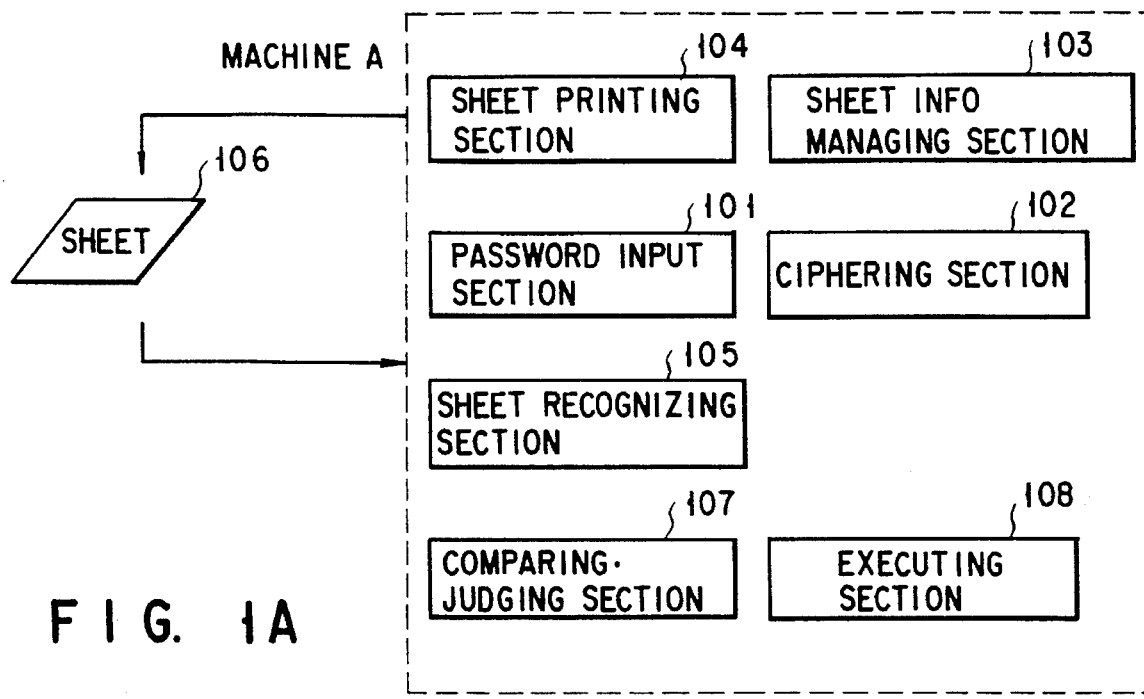
F I G. 1A
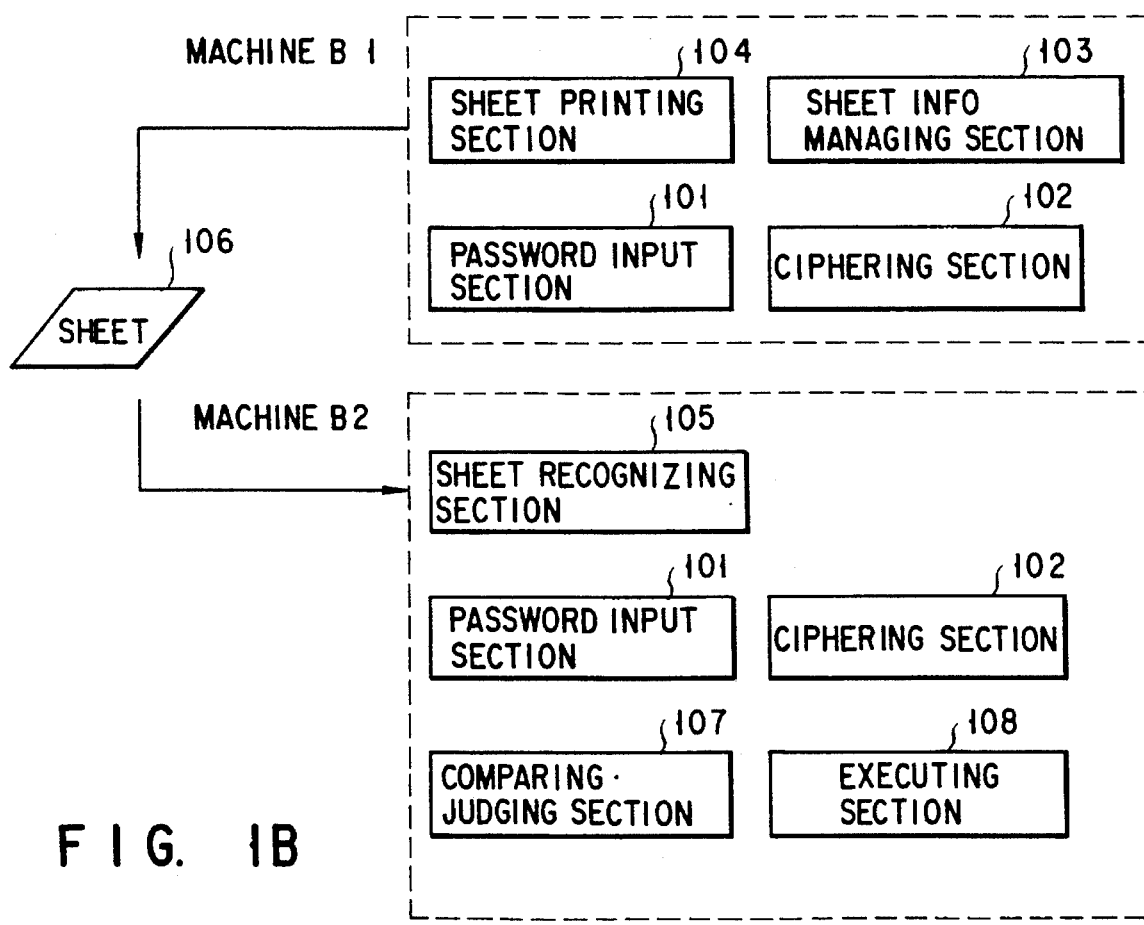
F I G. 1B

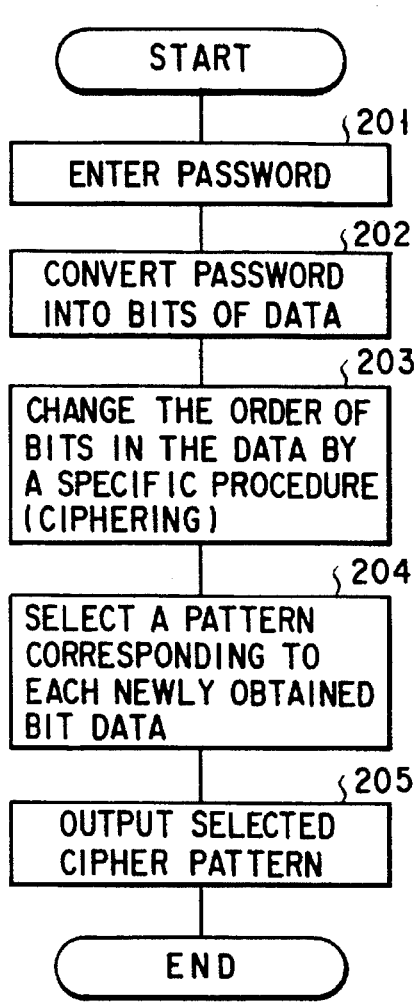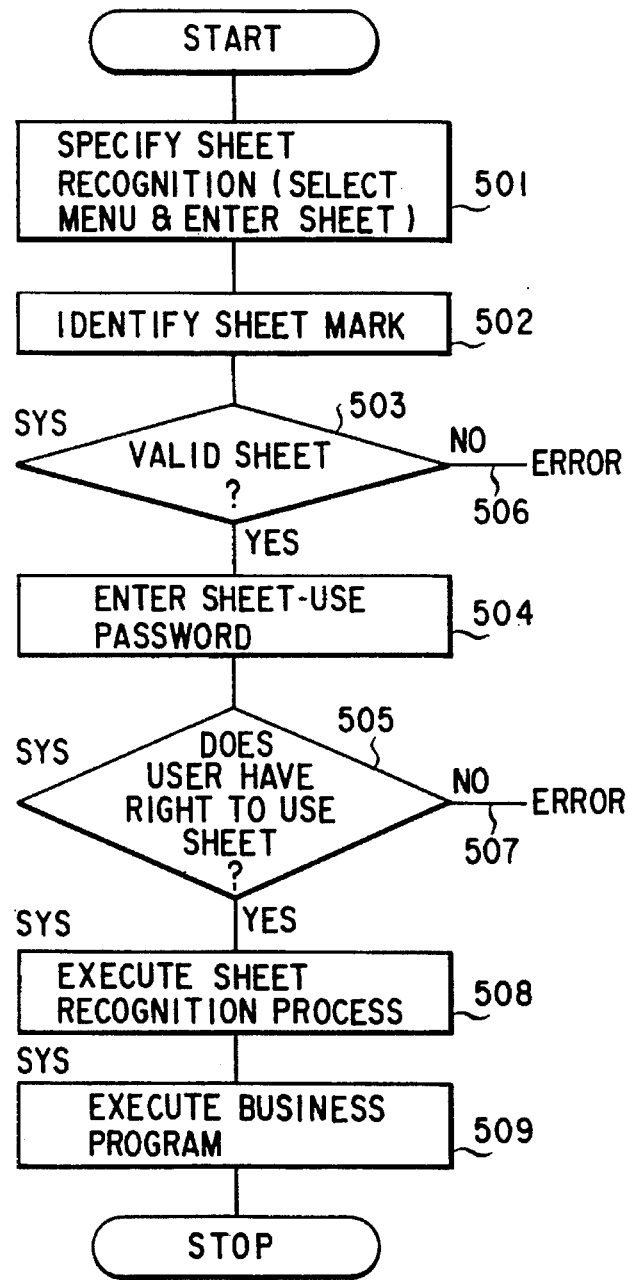
FIG. 2
FIG. 5

```
DOCUMENT RETRIEVAL              **10100
                                 aBC3X
USER ID              □□□□□□□

OPTICAL DISC NO.     □□□□

CLASSIFICATION NO. 1 □□□□

CLASSIFICATION NO. 2 □□□□

KEYWORD              □□□□□□□□□
                     □□□□□□□□□
                     □□□□□□□□□
                     □□□□□□□□□

PRINT                □ YES / □ NO

REMARKS              [          ]
```

F I G. 3

```
DOCUMENT RETRIEVAL              **10100
                                 XXXXX ~901
USER ID              □□□□□□□

OPTICAL DISK NO.     □□□□

CLASSIFICATION NO. 1 □□□□

CLASSIFICATION NO. 2 □□□□

KEYWORD              □□□□□□□□□
                     □□□□□□□□□
                     □□□□□□□□□
                     □□□□□□□□□

PRINT                □ YES / □ NO

REMARKS              [          ]
```

F I G. 9

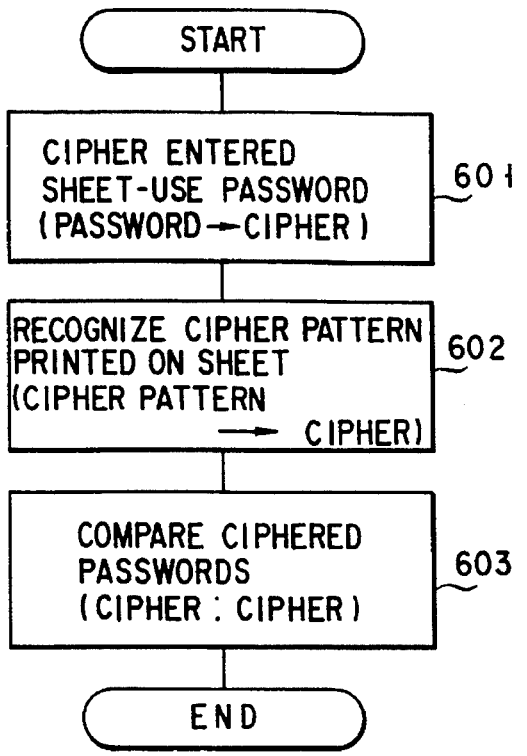
F I G. 6A
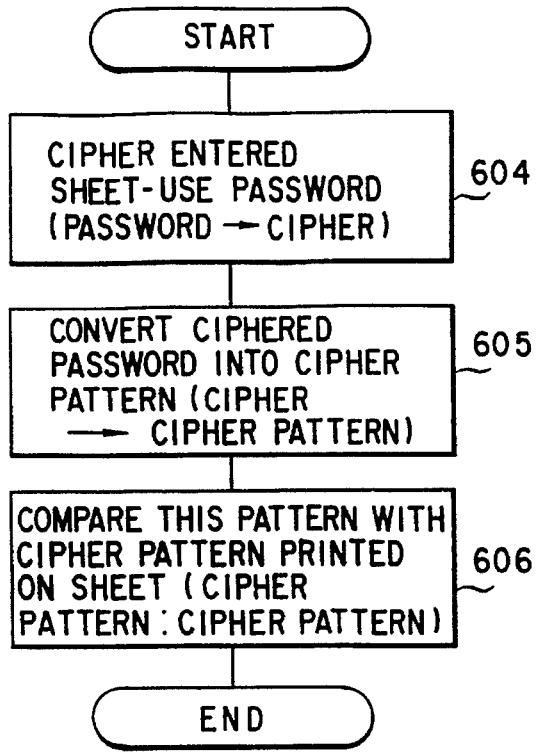
F I G. 6B
| USER'S LOG-ON NAME | CIPHERED LOG-ON PASSWORD | RIGHT TO PRINT SHEET |
|---|---|---|
| USER 1 | p Q r 5 e | YES |
| USER 2 | x Y z 8 a | NO |
F I G. 7
| SHEET NO. | DUTY SECRET LEVEL | BUS. PROGRAM | SHEET LAYOUT INFO |
|---|---|---|---|
| 10100 | 1 | TOUROKU_PROG | |
| 20100 | 0 | KENSAKU_PROG | |
F I G. 8

SYSTEM FOR SPECIFYING A DUTY BY MEANS OF A HANDWRITTEN SHEET WITH A CIPHER FUNCTION

BACKGROUND OF THE INVENTION

1. Field of the Invention

This invention relates to a system for performing processes by using a handwritten sheet to specify a duty.

2. Description of the Related Art

The prior art similar to this invention is disclosed in Jpn. Pat. Appln. KOKAI Publication No. 4-18844, which has described the techniques for identifying the addressee of electronic mail on a sheet to be faxed and automatically forwarding the contents received by FAX as electronic mail. These techniques help to ease the burden on the FAX sender of paying particular attention to sending electronic mail.

Further, Japanese Patent Application No. 3-63877 has disclosed the techniques for reading the necessary information from the faxed manuscript, referring to an image DB, and faxing the retrieved data. The techniques enable the existing terminals to access the DB unit.

Still further, Japanese Patent Application No. 1-264359 has disclosed the techniques for coping with errors in recognizing a remote instruction by FAX. Additionally, Japanese Patent Application No. 1-284167 has disclosed the techniques for processing a FAX input sheet for transit multi-address calling only.

In those conventional techniques, for example, if there is a fixed identification pattern specifying the addressee of electronic mail, the contents received by FAX will be automatically forwarded as electronic mail. Because it is impossible to check to see if the sender of the FAX has the right to execute duties on the electronic mail system, this causes a problem: security for the contents received by FAX cannot be ensured. In executing the duties of image DB reference and FAX communication, problems arise: it is impossible to identify the user or check the right to execution.

SUMMARY OF THE INVENTION

Accordingly, the object of the present invention is to assure security for a system by making it possible to check to see if the user is authorized to use a handwritten sheet specifying the contents of a duty or to set conditions for executing a duty.

The object is achieved only by a simple process at the time of handwritten sheet input, not requiring the process of referring to a system management information, without deteriorating the simplicity of handwritten sheets.

The foregoing object is accomplished by providing an information processing apparatus for executing a plurality of information processing, the apparatus comprising: means for storing format information which defines contents of instructions to execute at least one of the plurality of information processes; means for printing the format information stored in the storing means and first code information for judging permission to execute the information processing on a sheet; means for reading the sheet printed by the printing means for inputting the contents of instructions required to be executed on the information processing apparatus; means for inputting second code information when the reading means reads the sheet on which the format information is printed by the printing means; means for collating the first code information printed on the sheet by the printing means with the second code information input by the input means; and means for permitting the execution of information process corresponding to the contents of instructions printed on the sheet read by the sheet reading means on the basis of the collation result at the collating means.

With the above configuration, the invention prevents an unauthorized user from operating the system by means of an instruction sheet on the basis of the codes printed on the instruction sheet. As a result, security for the system can be assured without deteriorating the simplicity of handwritten instruction sheets.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B block diagrams of system according to embodiments of the present invention;

FIG. 2 shows a password ciphering process in the embodiment;

FIG. 3 illustrates an instruction sheet in the embodiment;

FIG. 5 is a flowchart for using an instruction sheet in the embodiment;

FIGS. 6A and 6B show the procedure for password collation to judge the right to use a sheet in the embodiment;

FIG. 7 is a table to help explain information on users in the embodiment;

FIG. 8 is a table to help explain information on instruction sheets;

FIG. 9 is a view to help explain an error processing function in the embodiment;

DETAILED DESCRIPTION OF THE PREFERRED EMBODIMENTS

Figure 4:
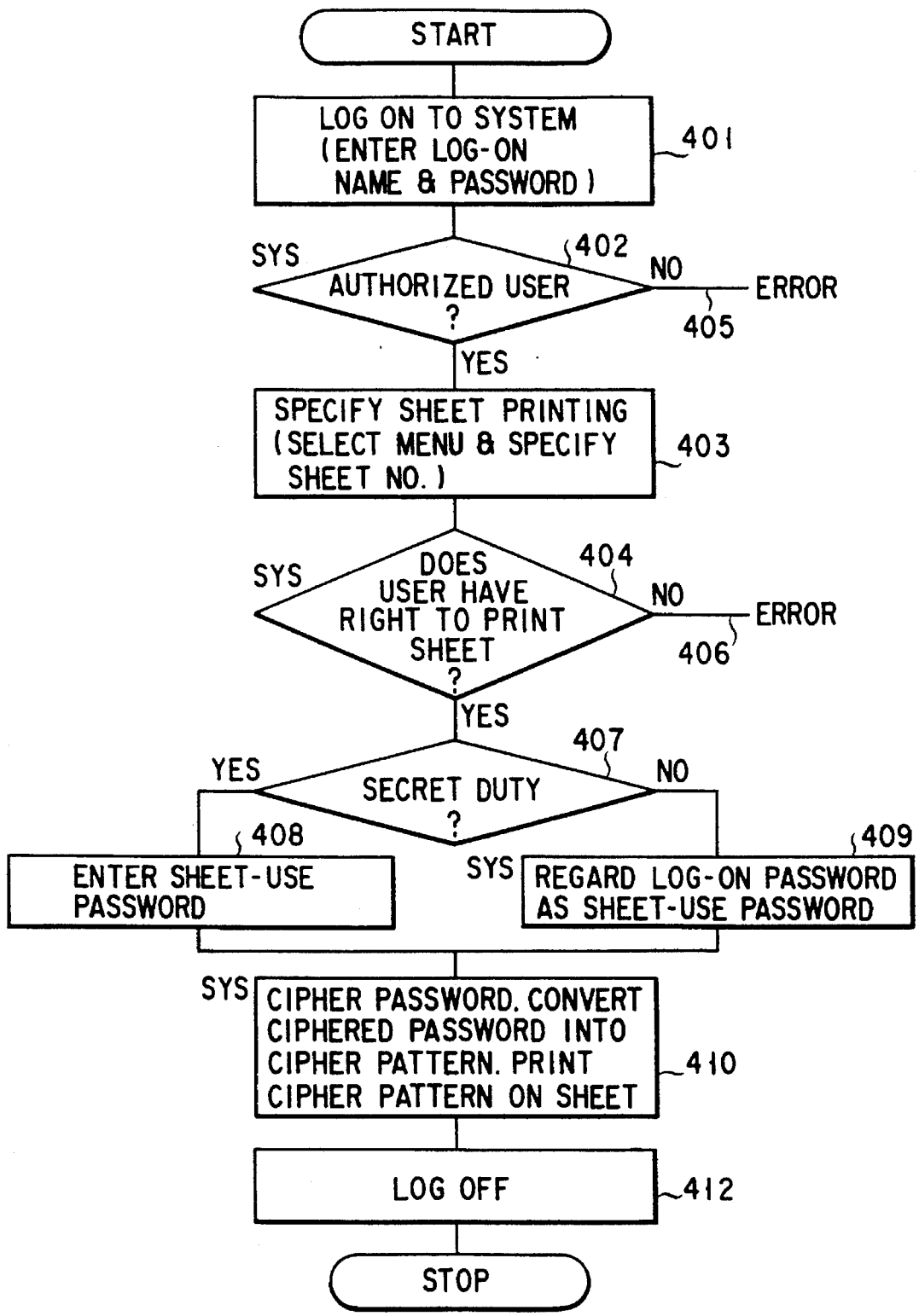
FIG. 4 is a flowchart for issuing an instruction sheet in the embodiment.

Hereinafter, embodiments of the present invention will be explained, referring to the accompanying drawings.

FIGS. 1A and 1B are block diagrams of systems according to embodiments of the invention.

The overall structure of each system basically comprises a password input section 101, a ciphering section 102, a sheet information managing section 103, a sheet printing section 104, a sheet recognizing section 105, a comparing judging section 107, and an executive section 108. These sections may be incorporated into a single unit (machine A) or be separated into a sheet issuing unit B1 and a sheet processing unit B2.

Specifically, in FIG. 1A, all the components 101 to 105 are contained in a single machine, which can issue and accept sheets. Additionally, in FIG. 1B, a single machine is composed of a sheet issuing unit B1 and a sheet processing unit B2, wherein the sheet issuing unit B1 comprises the password input section 101, the ciphering section 102, the sheet information managing section 103, and the sheet printing section 104, and the sheet processing unit B2 comprises the password input section 101, the ciphering section 102, and the sheet recognizing section 105.

The password input section 101 is an interface for enabling the user to input a password. The ciphering section 102, as shown in the figure, performs a ciphering process 203, a cipher patterning process 204, and a comparing process to determine whether ciphers agree or disagree with one another. The sheet information managing section 103 manages the sheet information in an instruction sheet in which a duty specifying process can be entered in handwriting.

FIG. 8 is a table to help explain the sheet information. The sheet information is made up of a sheet number 801 used to identify a sheet, a duty secret level 802 defining a duty's security, a business program to be executed on the basis of the result of the sheet recognizing process explained later, and the sheet layout information 804 necessary for printing the sheet.

The sheet printing section 104 acquires the sheet layout information 804 from the sheet information managing section 103, prints a sheet format with the sheet number specified by the user on paper, and issues an actual sheet 106.

The sheet recognizing section 105 recognizes an instruction sheet in which the duty instructions have been entered in handwriting. The recognition result is made up of a sheet number, a sheet-entering person's number, a sheet-entering date and time, a sheet-accepting machine, and parameter groups indicating duty instructions. The result is used to execute the program with the execution program name 803 retrieved from the sheet information managing section 103 according to the sheet number, or the type of duty.

FIG. 2 shows an example of ciphering a password in the embodiment.

The user-defined password on the instruction sheet is first entered in the system (201). The password is converted into bits of data (202). The order of bits in the data is changed through a specific procedure previously determined (203). This is a scrambling method, one of typical ciphering methods. Another method may, of course, be used for the same purpose. Then, a pattern corresponding to each set of bit data is determined in advance, and the pattern corresponding to each newly obtained bit data is selected (204). Then, the selected cipher pattern is outputted (205). The cipher pattern can be deciphered provided there is a table that relates the order that the bits have been changed to the patterns. The ciphered password may not necessarily be printable or readable.

FIG. 7 is a table to help explain the information on users in this embodiment. The ciphering process is used to cipher a log-on password defined by the user. The ciphered log-on passwords 702 in the information on users 700 are obtained by the ciphering process. Further, the ciphered password 203 is converted by the cipher patterning process into a cipher pattern 205. Because the ciphered password 203 is not necessarily printable, it is converted into a printable cipher pattern 205 in order to print on a sheet. Since this conversion method is not related to the essence of the invention (a duty instruction processing system), it will not be explained here. The cipher pattern 205 may be a character, a figure, or a two-dimensional pattern, as long as it is a printable image.

The ciphering process explained above is used to cipher the user-defined sheet-use password and then print it on a sheet.

FIG. 3 illustrates an instruction sheet of the embodiment.

At the top of the sheet, there is a character string of "Document Retrieval" indicating the name of a duty. Printed on the top right end of the sheet are the mark  used to identify the instruction sheet, the sheet number "10100" used to identify the type of sheet, and aBc3X obtained by performing the ciphering process 202 and the cipher patterning process 204 on the sheet-use password 201 for this sheet to convert the password into the cipher pattern 205**.

The sheet number and the ciphered password may be placed in any position on the sheet, provided that they are recognized by the sheet recognizing section before the section recognizes the contents of the overall handwritten sheet.

In the following portions of the sheet, the fields in which the necessary parameters for "Document Retrieval" are to be entered in handwriting are arranged together with their explanation. In the field "Print ☐Yes/☐No", either ☐ is supposed to be painted over to indicate whether or not the retrieved document is printed. A frame at the bottom of the sheet is an image area in which any image data such as a memo, a figure, or a signature can be drawn. These items are recognized by the sheet recognizing section.

FIG. 4 is a flowchart for issuing an instruction sheet in the embodiment. The portions marked with "sys" indicate system processes and those without this symbol indicate the user's actions.

The user who wants the system to issue a sheet first logs on to the system (401). At this time the user enters a log-on name and a log-on password from the password input section 101. The system compares the user's log-on name 701 with the entered log-on name and the ciphered log-on password 702 with the entered ciphered log-on password, referring to the information on users shown in FIG. 7. If they agree with each other, it will determine that the user is authorized (402).

Next, the user specifies sheet printing (403). In this case, the user selects a sheet printing menu, and specifies the sheet number of the sheet that the user wants to print. The system checks the right to print a sheet (404). The right to print a sheet is a step to assure security, and is assigned only to the users previously permitted and registered with the system (i.e., the users whose right to print a sheet (703) in the user information (700) in FIG. 7 is marked with YES). When the system compares the log-on name during log-on time with the log-on name (701) in the user information (700) in FIG. 7 and the log-on password during log-on time with the log-on password (702) in the user information in FIG. 7, if they agree with one another, the system will determine that the user is authorized and permit the user to print.

If the system cannot determine whether or not the user is authorized in checking the log-on and the right to print a sheet, it will send the user an error message and refuse the log-on or the sheet printing process (405, 406).

Then, the system checks to see if the duty is a secret one (407), referring to the duty secret level 802 of the duty corresponding to the sheet with the sheet number specified for printing.

If it is a secret duty (duty secret level=1), the user must enter the sheet-use password (408). The sheet-use password is a password previously assigned only to a user permitted to use a sheet in order to ensure security for the duty specifying process using a handwritten sheet. The system, when issuing a sheet, ciphers the sheet-use password, converts the ciphered password into a cipher pattern, and prints the pattern on a sheet as a clue to check the authorization to use the sheet.

When it is not a secret duty (duty secret level=0), the system regards the log-on password used to log on for sheet printing as the sheet-use password (409). The system ciphers the thus obtained sheet-use password, converts the ciphered password into a cipher pattern, and prints on a sheet the cipher pattern in a sheet format based on the sheet layout information (410). The cipher pattern is, for example, "aBc3X" at the top right of the sheet in FIG. 3.

Now, the user can obtain a sheet with the specified sheet number (411). When the user logs off, this will terminate the process of issuing a sheet (412).

FIG. 5 is a flowchart for using an instruction sheet in the embodiment. The portions marked with "sys" indicate system processes and those without this symbol indicate the user's actions.

The user first specifies sheet recognition (501). At this time, the user selects sheet recognition menu and causes the sheet recognizing section (105) to read a sheet in which the contents of a duty are entered in handwriting.

The system identifies the sheet mark  printed on the entered handwritten sheet, the mark indicating that the sheet is valid (502). Any mark may be used as the sheet mark as long as it enables the sheet to be identified as valid. Based on the identification result, it is judged whether or not the entered sheet is valid (503). When it is judged that the sheet is valid, the user enters the sheet-use password to tell the system that the user is authorized (504**).

In the case of secret duties, a manager-defined password unique to a duty and assigned only to the user authorized to perform the duty is used as a sheet-use password when duties are not secret, a password assigned to each user is used as a sheet-use password to assure security in performing each duty. The system judges whether or not the user has the right to use the sheet on the basis of the entered sheet-use password (505). If it is judged that the sheet is invalid or the user is not authorized, that is, the user has no right to use the sheet, the system sends the user an error message (506, 507).

If it is judged that the user has the right to use the sheet, or the user is authorized to use the sheet, the process of recognizing the entire sheet is carried out (508). According to the result of the sheet recognition, a business program corresponding to the sheet number or the type of duty (509). What has been explained above is the flow of using a sheet.

FIG. 6 shows the procedure for collating passwords to judge the right to use a sheet in the embodiment. The passwords to be collated are a sheet-use password entered from the password input section (101) during sheet input, and a sheet-use password (the log-on password of the user asking for the issuing of a sheet, when the duty is not secret) entered from the password input section 101 during sheet issuing before use of sheet.

The sheet-use password entered during sheet issuing transfers to the cipher pattern 205 in the ciphering process explained in FIG. 2, and the password is printed as an image on a sheet during sheet by the sheet printing section 104.

There are two methods of collating passwords to judge the right to use the sheet. FIG. 6A shows a method of comparing ciphered passwords 203 and determining whether they agree or disagree with each other. A ciphered password (203) is obtained by performing the ciphering process (202) on the sheet-use password entered during sheet input (601). On the other hand, the system also obtains a ciphered password (203) by recognizing the cipher pattern (205), an image printed on the sheet, or effecting the reverse of the cipher patterning process (204) (602). The system then compares and collates these two ciphered passwords (203) with each other (603).

FIG. 6B shows a method of comparing the images of cipher patterns (205) to determine whether they agree or disagree with each other.

A ciphered password 203 is obtained by performing the ciphering process on the sheet-use password entered during sheet input (603). This ciphered password is further subjected to the cipher patterning process 204 to obtain a cipher pattern 205 in the form of an image (605). On the other hand, the cipher pattern, an image printed on the sheet, is read directly as an image. These two images of ciphered patterns 205 are compared and collated directly with each other (606).

Either method in FIGS. 6A and 6B may be used in password collation.

In a series of processes described above, the right to use the sheet is judged by ciphering the sheet-use password, converting the ciphered password into a cipher pattern, and printing the pattern on a sheet at the time of sheet issuing, and causing the user to enter the same sheet-use password at the time of sheet input, and comparing the printed password with the entered password.

For sheet issuing, the system judges that the user has been authorized to print the sheet and then starts to print the sheet. Further, the system prints a cipher pattern obtained by performing a certain conversion of the sheet-use password predetermined according to the type of duty on a sheet, as a clue to checking the right to use the sheet. By asking the user to enter the password corresponding to the cipher pattern at the time of sheet input, the system determines whether or not the user is authorized and assures security for duty instructions and performance.

The sheet-use password may be a password assigned to each user, a password assigned to each organization whose users alone know the password, or a password assigned to each duty only the users concerned with which know the password. Depending on how the password is set, security check can be achieved in various ways.

In the password collation for judging the right to use the sheet, just recognizing the cipher pattern image printed on the sheet makes it possible to identify the user who has specified the duty using a sheet. Because the password collation is not performed by referring to a system management table, it is possible to judge the right to use the sheet provided there are at least the password input section 101 and the ciphering section 102, even when the sheet recognizing section 105 is installed on a separate unit different from the sheet information managing section 103. This makes it easy to achieve a machine with a sheet identifying function and to construct the system. In the embodiment described above, the point is to identify the user attempting to use a sheet, or to execute the duty instructions. Another embodiment can be considered which provides a method of improving security with this embodiment, the system sets the period of validity of a sheet at the time of sheet issuing, prints this information on the sheet, compares the current date and time with the period of validity printed on the sheet at the time of sheet input, and if the current date and time has exceeded the period of validity, determines that the sheet is invalid and does not recognize the entire sheet.

In this embodiment, there are a method of printing a valid sheet input machine on a sheet in such a manner that the user can understand its meaning and a method of ciphering a valid sheet input machine and printing the ciphered expression on a sheet in such a manner that user cannot understand its meaning.

Still another embodiment can be considered which improves security. This embodiment specifies a valid sheet accepting machine at the time of sheet issuing and prints this information on a sheet. The system compares its sheet accepting machine with the specified sheet accepting machine on the sheet. If they coincide with each other, the system will determine that the sheet is invalid and do not perform the recognizing process.

In this embodiment, there are a method of printing the restriction of a sheet inputting apparatus in such a manner that the user can understand its meaning and a method of ciphering the period of validity and printing the ciphered expression on a sheet in such a manner that user cannot understand its meaning.

Still another embodiment can be considered with which, sheet-use conditions are set at the time of sheet issuing, and these conditions are printed on the sheet. The system, at the time of sheet input, compares the sheet-use conditions at the time that the sheet input was actually entered with the sheet-use conditions printed on the sheet to judge whether or not they agree with each other. If the sheet-use conditions do not agree with each other, the system will determine that the sheet is invalid, and does not execute the recognizing process.

Figure 10:
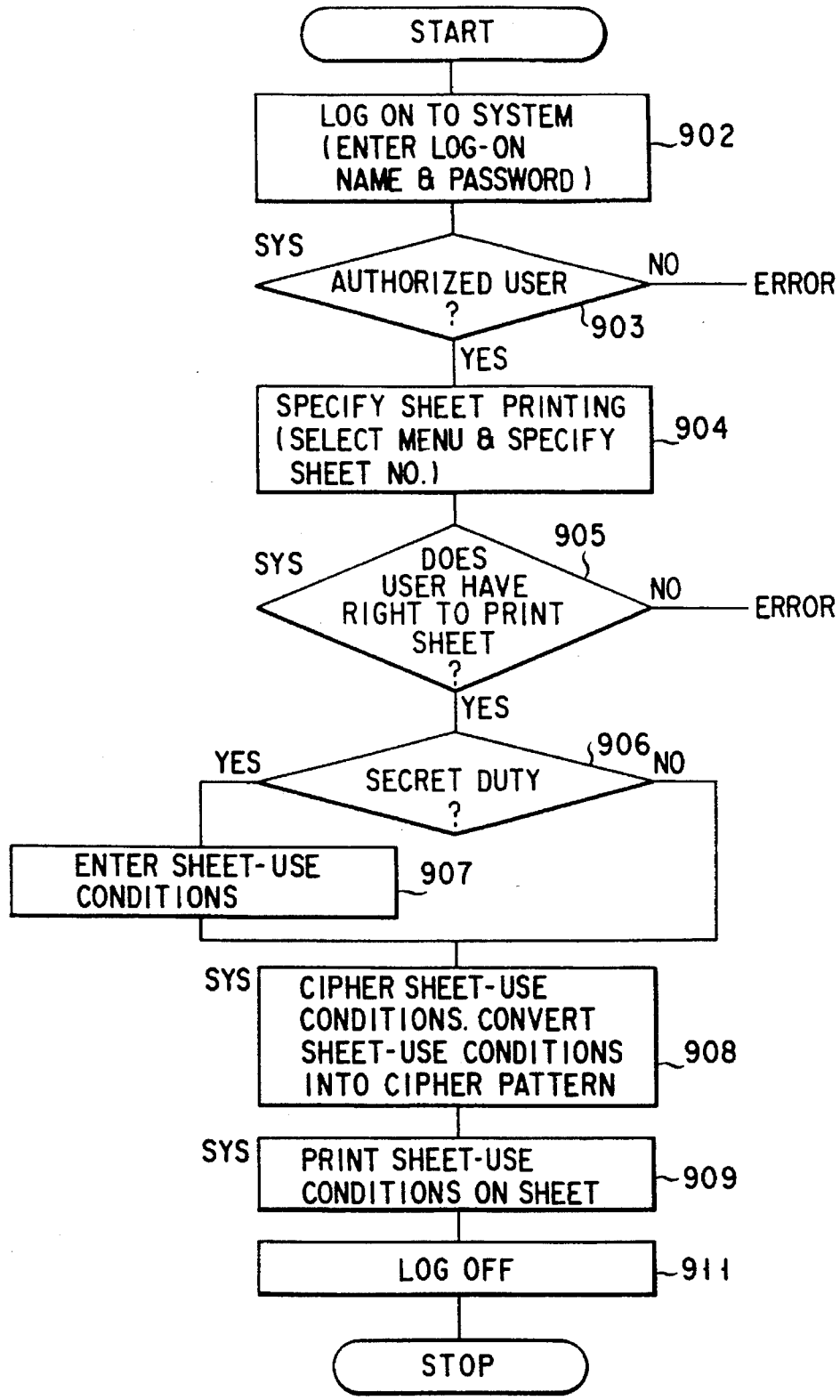
FIG. 10 is a flowchart for issuing an instruction sheet in anther embodiment of the present invention.
Figure 11:
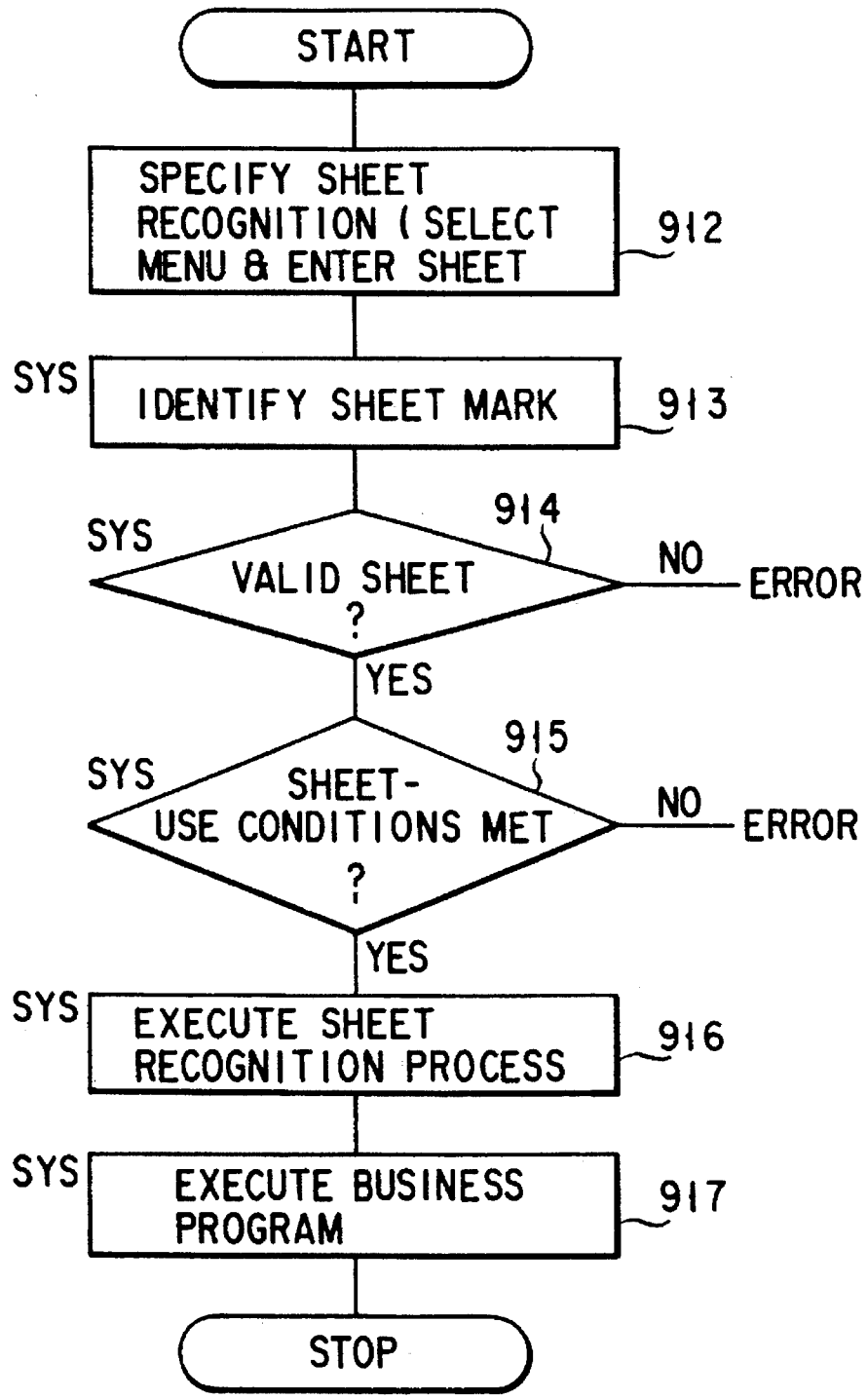
FIG. 11 is a flowchart for using an instruction sheet in this embodiment of the invention.

FIG. 10 is a flowchart for issuing an instruction sheet in another embodiment of the present invention. FIG. 11 is a flowchart for using an instruction sheet in this embodiment. The portions marked with "sys" indicate system processes and those without this symbol indicate the user's actions.

In FIG. 10, the user logs on to the system in order to issue an instruction sheet (902). Then, the system judges whether or not the user is authorized (903). If the user is not authorized, the system sends the user an error message. If the user is authorized, the user is allowed to specify sheet printing (904). The system judges whether or not the user has the right to print the sheet (905). If the user has not the right, the system sends the user an error message. If the user has the right, the user is requested to enter sheet-use conditions only when the duty is a secret one (907). After ciphering the sheet-use conditions and converting the ciphered conditions into a cipher pattern (908), the system prints the ciphered pattern on the sheet (909). After getting the printed sheet (910), the user logs off (911).

To use the instruction sheet, the user instructs the system to perform sheet recognition (912). Then, the system identifies the sheet mark (913) and judges whether or not the sheet is valid (914). If the sheet is invalid, the system outputs an error message. If the sheet is valid, it will judge whether or not the sheet meets the sheet-use conditions (915). If the sheet does not meet the conditions, the system outputs an error message. If the sheet meets the conditions, it will carry out the sheet recognizing process (916) and execute the business program (917).

In this embodiment, there are a method of printing the sheet-use conditions on a sheet in such a manner that the user can understand its meaning and a method of ciphering the conditions and printing the ciphered expression on a sheet in such a manner that user cannot understand its meaning.

In the above embodiments, because a clue to a security check for sheet use is printed on a sheet at the time of sheet issuing, it is not necessary to refer to a system management table. Therefore, even when the sheet recognizing section 105 is installed on a machine different from the sheet information managing section 103 as shown in FIG. 1B, it is possible to make a security check for sheet use, provided there are at least the password input section 101 and the ciphering section 102. This makes it easy to achieve a machine with a sheet identifying function and to construct the system.

FIG. 9 shows an example used to help explain an error processing function in the embodiment.

As a result of judging sheet use, if it is judged that the user is not allowed to use the sheet, it is judged that a sheet use error has occurred. Then, after the clue to judgment on sheet use printed on the sheet is smeared away, the sheet is discharged (901). This makes it impossible to attempt to use the sheet again. Namely, destroying the password information necessary for judgment on sheet use helps improve security.

Another embodiment can be considered which disables judgment on sheet use.

This invention may be practiced or embodied in still other ways without departing from the spirit or essential character thereof.

As has been explained above, with the present invention, when a handwritten sheet is used to specify the contents of a high-security duty, the system security can be improved by identifying the user who has entered the handwritten sheet and checking the permission to use the written sheet, or the right to execute the duty or access the data. The identifying of the user of the handwritten sheet can be effected simply by comparing the ciphered password added during handwritten sheet printing with the ciphered password based on the password entered by the user at the time of handwritten sheet input. This identification does not require the process of referring to a system management table. Therefore, it is possible to assure security by a simple process on the sheet input terminal side only.

Further, by setting a password or sheet-use conditions by duty, organization, or individual, permission to use a handwritten sheet can be controlled closely. Additionally, by limiting the period of validity or specifying a valid device on the handwritten sheet entered, security can be improved further.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information processing apparatus for executing a plurality of information processing, said apparatus comprising:

means for storing format information which defines contents of instructions to execute at least one of the plurality of information processes;

means for printing the format information stored in the storing means and first code information for judging permission to execute the information processing on a sheet;

means for reading the sheet printed by said printing means for inputting the contents of instructions required to be executed on said information processing apparatus;

means for inputting second code information when said reading means reads the sheet on which the format information is printed by said printing means;

means for collating the first code information printed on the sheet by said printing means with the second code information input by said input means; and means for permitting the execution of information process corresponding to the contents of instructions printed on the sheet read by said sheet reading means on the basis of the collation result at said collating means, wherein said printing means contains first conversion means for converting said first code information into first ciphered information, second conversion means for converting the first ciphered information converted by the first conversion means into pattern information; and means for printing the pattern information converted by the second conversion means on said sheet.

2. An information processing apparatus according to claim 1, wherein said first conversion means contains means for performing a ciphering operation by converting said first code information into bits of information and changing the order of bits in the information in a specified sequence.

3. An information processing apparatus according to claim 1, wherein said collating means contains third conversion means for converting the pattern information read by said reading means into the first ciphered information, fourth conversion means for converting the second code information input by said input means into second ciphered information, and means for comparing the first ciphered information converted by said third converting means with the second ciphered information converted by said fourth conversion means.

4. An information processing apparatus according to claim 1, wherein said collating means contains fifth conversion means for converting the second code information input from said input means into pattern information and means for comparing the pattern information converted by the fifth conversion means with the pattern information indicating the first code information read by said reading means.

5. A method of processing data for executing a plurality of information processing, said apparatus comprising the steps of:

storing format information which defines the contents of instructions to execute at least one of the plurality of information processes;

converting first code information into first ciphered information;

converting the first ciphered information into pattern information;

printing the format information stored at the storing step and the pattern information for judging permission to execute the information processing on a sheet;

reading the sheet printed at the printing step for inputting the contents of instructions required to be executed on said information processing apparatus;

inputting second code information when the sheet is read at the reading step on which the format information is printed at the printing step;

collating the first code information printed on the sheet at the printing step with the second code information input at the input step; and permitting the execution of information process corresponding to the contents of instructions printed on the sheet read at the sheet reading step on the basis of the collation result at the collating step.

* * * * *